United States Patent [19]
Iida

[11] Patent Number: 5,626,965
[45] Date of Patent: May 6, 1997

[54] MAGNETOOPTICAL RECORDING MEDIUM

[75] Inventor: Haruhisa Iida, Yokohama, Japan

[73] Assignee: Nikon Corporation, Tokyo, Japan

[21] Appl. No.: 482,507

[22] Filed: Jun. 7, 1995

Related U.S. Application Data

[63] Continuation of Ser. No. 233,333, Apr. 26, 1994, abandoned.

[30] Foreign Application Priority Data

Apr. 27, 1993 [JP] Japan .................... 5-100701

[51] Int. Cl.$^6$ ............................................... G11B 5/66
[52] U.S. Cl. .................. 428/332; 428/336; 428/694 ML; 428/694 RE; 428/694 MM; 428/694 MT; 428/694 EC; 428/900; 360/131; 360/135; 365/122; 368/13; 368/14
[58] Field of Search ............. 428/694 ML, 694 RE, 428/694 MM, 694 MT, 694 EC, 332, 556, 900; 360/131, 135; 365/172; 369/13, 14

[56] References Cited

U.S. PATENT DOCUMENTS

| | | | |
|---|---|---|---|
| 4,753,853 | 6/1988 | Sato | 428/679 |
| 5,030,512 | 7/1991 | Kato | 428/336 |
| 5,094,925 | 3/1992 | Ise | 428/694 MM |
| 5,248,565 | 9/1993 | Tsutsumi | 428/694 EC |

FOREIGN PATENT DOCUMENTS

| | | |
|---|---|---|
| 57-78652 | 5/1982 | Japan . |
| 59-168954 | 9/1984 | Japan . |
| 63-14342 | 1/1988 | Japan . |

*Primary Examiner*—Leszek Kiliman
*Attorney, Agent, or Firm*—Shapiro and Shapiro

[57] ABSTRACT

A magnetooptical recording medium includes a substrate formed with a guide groove for tracking a laser beam, and first and second magnetic layers which are stacked on the substrate and each of which consists of an amorphous heavy rare earth-transition metal alloy. The first and second magnetic layers are magnetically coupled to each other. The first magnetic layer has a relatively high Curie temperature and a relatively low coercivity at room temperature, and the second magnetic layer has a relatively low Curie temperature and a relatively high coercivity at room temperature. The film thickness $t_1$ of the first magnetic layer and the film thickness $t_2$ of the second magnetic layer satisfy a condition $t_2/t_1 \geq 2.5$.

1 Claim, 3 Drawing Sheets

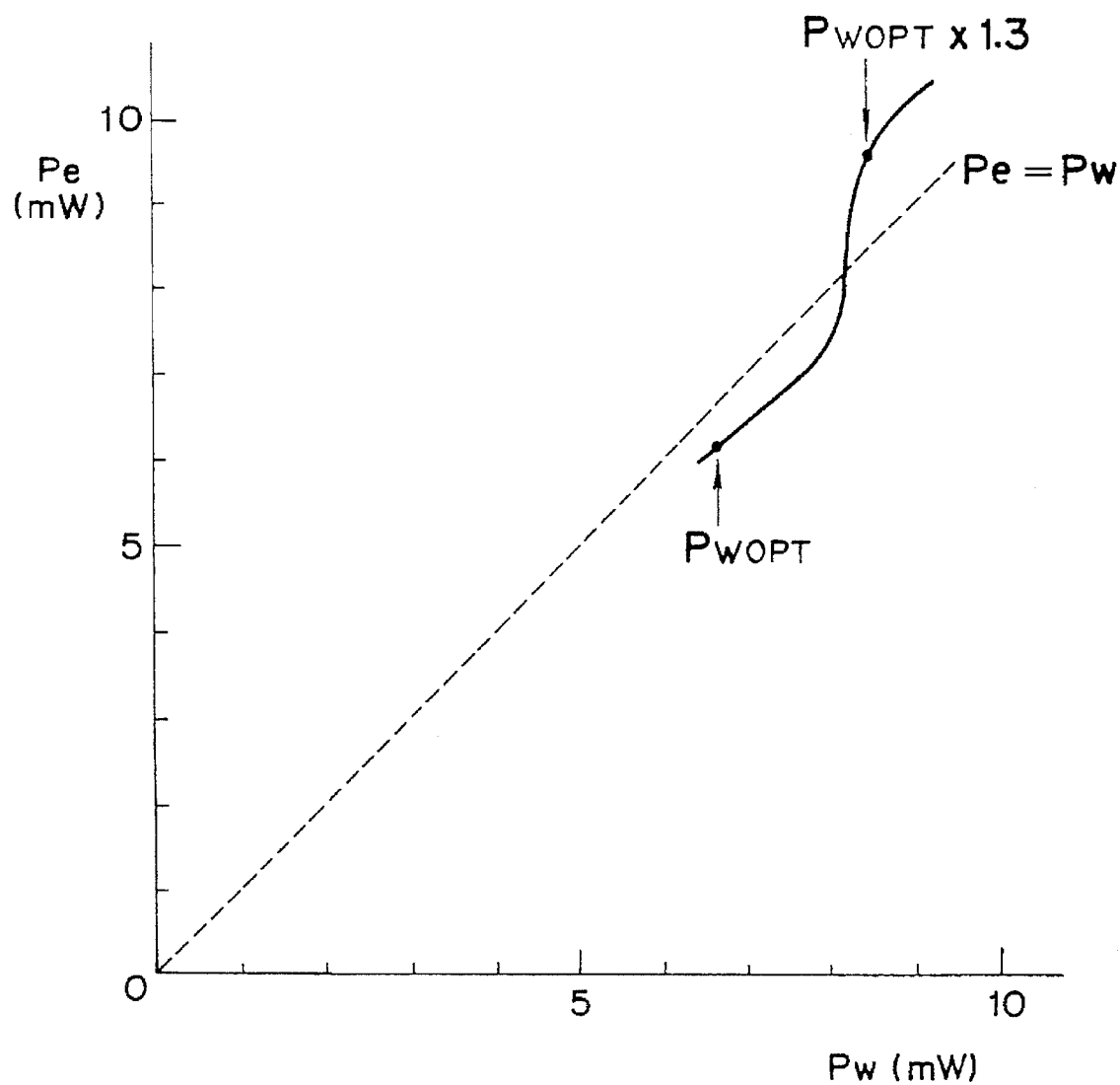

MAGNETOOPTICAL RECORDING MEDIUM

This is a continuation of application Ser. No. 08/233,333 filed Apr. 26, 1994, now abandoned.

BACKGROUND OF THE INVENTION

1. Field of the Invention

The present invention relates to a magnetooptical recording medium.

2. Related Background Art

In recent years, many efforts have been made to develop an optical recording/reproduction method which can satisfy various requirements including high density, large capacity, high access speed, and high recording/reproduction speed, and a recording apparatus, a reproduction apparatus, and a recording medium which are used for this method.

Of various optical recording/reproduction methods, a magnetooptical recording/reproduction method is most attractive due to its unique advantages that information can be erased after it is recorded, and new information can be repetitively recorded.

A recording medium used in this magnetooptical recording/reproduction method uses a magnetic thin film having a perpendicular magnetic anisotropy as a recording layer. The magnetic thin film comprises an amorphous heavy rare earth-transition metal alloy. A typical example of the alloy includes GdFe, FdCo, GdFeCo, TbFe, TbCo, TbFeCo, and the like.

In general, the direction of magnetization of a recording layer is initialized in one of upward and downward directions before recording. In recording, the temperature of a portion of the recording layer is increased by a laser beam focused to have a spot size of about 1 μm to a temperature near the Curie temperature, and a mark having magnetization in the opposite direction is formed using a recording field Hb. In general, information is expressed by the presence/absence or the recorded mark length of a recorded mark. Information is reproduced using polarization of reflected light of the radiated laser beam at a Kerr rotation angle θk. When an erase field He is applied in a direction of magnetization opposite to that in the recording mode, and the temperature of a corresponding portion of the recording layer is increased by a laser beam to a temperature near the Curie temperature, the formed mark can be erased. Information can be repetitively rewritten by repeating erasing and recording operations.

It is generally difficult to obtain, using a single magnetic material, a recording layer which has a low Curie temperature to allow easy recording, has a large coercivity to allow high preservation stability of recorded information, and has a large θk and a high C/N ratio in the reproduction mode.

For this reason, a two-layered film magnetooptical recording medium has been proposed. In this medium, functions required for the recording layer are divided into two layers, e.g., a recording layer (or a recording holding layer) in the strict sense of the word and a reproduction layer, and magnetic materials having compositions respectively suitable for these layers are selected. As one of recording media of this type, a recording medium disclosed in Japanese Laid-Open Patent Application No. 57-78652 is known. This recording medium comprises a two-layered film including a magnetic layer (lower coercivity layer) having a relatively high Curie temperature and a relatively low coercivity at room temperature, and a magnetic layer (higher coercivity layer) having a relatively low Curie temperature and a relatively high coercivity at room temperature. The higher and lower coercivity layers are exchange-coupled to each other. This recording medium has high recording sensitivity since recording is performed at a temperature near the lower Curie temperature of the higher coercivity layer, and has a high C/N ratio since reproduction of recorded information is performed from the side of the lower coercivity layer which has a high Curie temperature and a large Kerr rotation angle. Also, this recording medium has excellent preservation performance since information is preserved by the higher coercivity layer.

Japanese Laid-Open Patent Application No. 63-14342 describes a magnetooptical recording medium which has a higher coercivity layer exhibiting a low Curie temperature, and a lower coercivity layer exhibiting a high Curie temperature, and in which each of these layers comprises an amorphous alloy consisting of a rare earth element and a transition metal element. The film thickness of the higher coercivity layer is 50 Å or more, and is smaller than that of the lower coercivity layer. Japanese Laid-Open Patent Application No. 59-168954 also describes a magnetooptical recording medium having a similar arrangement, and proposes a magnetooptical recording medium which allows writing of information with lower energy, and assures a high S/N ratio due to a large Kerr rotation angle in the reproduction mode.

In general, a recording layer in a magnetooptical recording medium is formed on a substrate on which a guide groove is formed in advance for the purpose of tracking of a laser beam. However, the above-mentioned recording medium, in which the recording layer comprising the two-layered film is formed on the substrate pre-formed with the guide groove, has poor erase characteristics of a recorded mark. For example, in order to completely erase a recorded mark, radiation of laser power 1.1 times or more of that radiated in the recording mode is required. Normally, in a magnetooptical recording medium having a single recording layer, a recorded mark can be almost completely erased by radiating a laser beam with power substantially equal to that radiated in the recording mode. As compared to this medium, the above-mentioned recording medium is a medium in which information is not easy to erase.

A semiconductor laser which is currently used in a magnetooptical recording apparatus has a limited laser power output. For this reason, in a recording medium in which information can be erased by only a semiconductor laser with high-intensity laser power, a recorded mark cannot often be erased due to the performance of the apparatus. In order to surely erase information, the linear velocity of the recording medium may be lowered. In this case, however, the merits, i.e., recording at a high linear velocity due to high recording sensitivity, and a high information transfer rate, of the two-layered film magnetooptical recording medium are lost.

SUMMARY OF THE INVENTION

The present inventors examined the relationship between the laser power in a recording mode and the laser power required for erasing a recorded mark recorded with the recording laser power in recording media respectively comprising a single-layered film and a two-layered film.

As a result of extensive studies, the present inventors found the following facts.

(i) The relationship between laser power ($P_W$) in a recording mode and lower power ($P_e$) required for erasing a recorded mark recorded with the laser power $P_W$ in a conventional two-layered film medium is as shown in FIG. 3. As the recording power increases, the laser power required for erasing increases. However, when the laser power in the recording mode is relatively low, a recorded mark can be erased with lower laser power than that in the recording mode. However, when the power of a laser beam in the recording mode exceeds a certain threshold value, the laser power required for erasing immediately increases, and a recorded mark cannot be sufficiently erased with the same power as that in the recording mode. The reason for this is assumed to be as follows. With such power exceeding the threshold value, since a recorded mark is recorded with a larger width, the recorded mark is undesirably formed in a portion of a guide groove in which a recorded mark must not be formed, and the recorded mark formed on the guide groove becomes difficult to erase.

(ii) In the single-layered film recording medium (e.g., a TbFe single layer), as the laser power in the recording mode increases, the laser power required for erasing increases. However, this recording medium does not have any threshold value observed in the two-layered film, and a recorded mark can be sufficiently erased with laser power equal to lower than that in the recording mode. Even when it is assumed that a recorded mark is formed extending into the guide groove, it is not particularly difficult to erase the recorded mark unlike in the two-layered film.

From these results, the present inventor found that the erasing characteristics of a recorded mark of a two-layered film could be set to be equivalent to those of the single-layered recording medium while maintaining the advantages of the two-layered film by controlling the film thicknesses of recording layers in the two-layered film, and achieved the present invention.

Thus, according to the present invention, there is provided a magnetooptical recording medium in which first and second magnetic layers each consisting of a heavy rare earth-transition metal alloy having perpendicular magnetic anisotropy are stacked on a substrate formed with a guide groove for tracking a laser beam so as to be magnetically coupled to each other, the first magnetic layer has a relatively high Curie temperature ($T_{C1}$) and a relatively small coercivity ($H_{C1}$) at room temperature, and the second magnetic layer has a relatively low Curie temperature ($T_{C2}$) and a relatively large coercivity ($H_{C1}$) at room temperature (more specifically, the Curie temperature $T_{C1}$ of the first magnetic layer is higher than the Curie temperature $T_{C2}$ of the second magnetic layer, and the coercivity $H_{C1}$ of the first magnetic layer is smaller than the coercivity $H_{C2}$ of the second magnetic layer), wherein when the film thickness of the first magnetic layer is represented by $t_1$, and the film thickness of the second magnetic layer is represented by $t_2$, the magnetooptical recording medium satisfies:

$$t_2/t_1 \geq 2.5$$

When the film thickness $t_2$ of the higher coercivity layer in the two-layered film is set to be relatively larger than the film thickness $t_1$ of the lower coercivity layer, a recorded mark can be efficiently erased like in a single-layered film recording medium. The reason for this will be described below.

In the magnetooptical recording medium comprising the two-layered film, recording/erasing is performed at a temperature near the Curie temperature of the higher coercivity layer. At this Curie temperature, the lower coercivity layer still has large magnetization. For this reason, a demagnetizing field larger than that in a single-layered film acts on the recording medium itself. The demagnetizing field largely influences the recording/erasing characteristics of the two-layered film magnetooptical recording medium. In particular, in erasing, the demagnetizing field acts in a direction to disturb erasing. This is considered as a reason for inferior erasing characteristics of the two-layered film magnetooptical recording medium to those of a single-layered film.

On the other hand, the recording/erasing characteristics are determined under a condition which minimizes the sum of three energies, i.e., external field energy, demagnetizing field energy, and magnetic wall energy. When the film thickness of the higher coercivity layer is set to be larger than that of the lower coercivity layer, the ratio of the demagnetizing field energy which contributes to the erasing characteristics can be lowered relative to those of the remaining two energies. For this reason, the erasing characteristics of the two-layered film can be improved.

BRIEF DESCRIPTION OF THE DRAWINGS

FIG. 3 is a graph showing the relationship between the laser power in a recording mode and the minimum laser power required for erasing a mark recorded with the recording power in a conventional magnetooptical recording medium.

DETAILED DESCRIPTION OF THE PREFERRED EMBODIMENTS

Example 1

Figure 1:
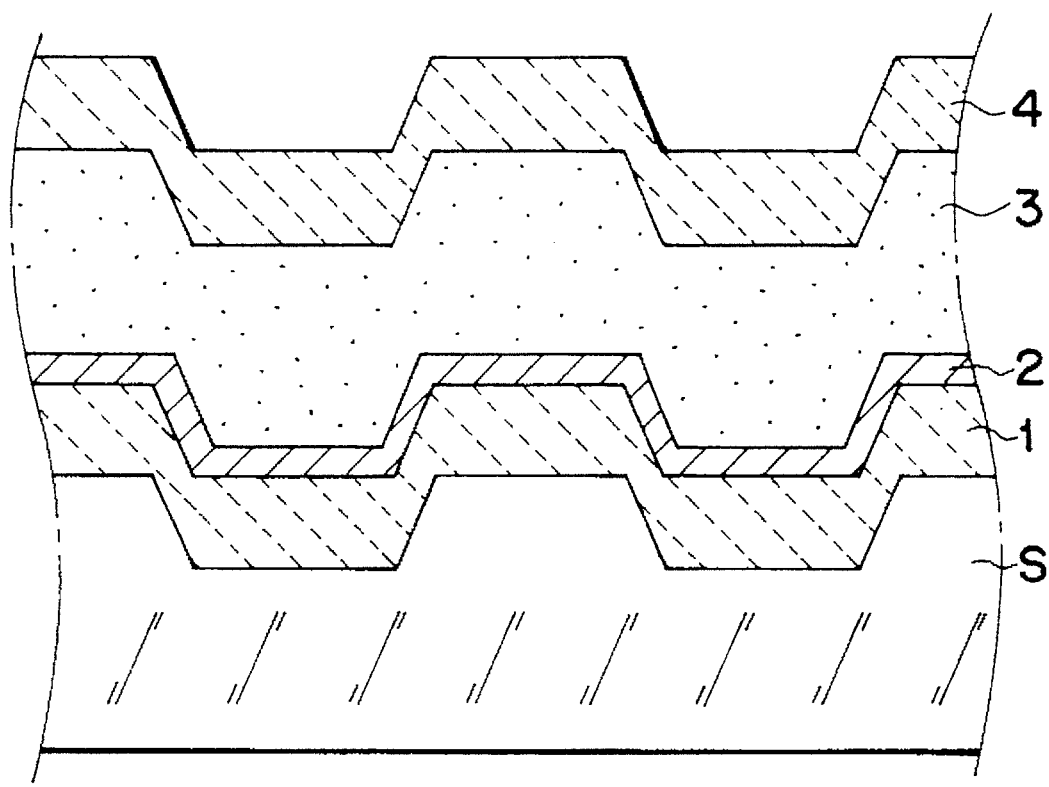
FIG. 1 is a sectional view showing the vertical section of a magnetooptical recording medium according to an example of the present invention.

FIG. 1 is a sectional view showing the vertical section of a magnetooptical recording medium according to this example.

A substrate S, which was prepared by forming guide grooves with a pitch of 1.6 μm, a width of 0.4 μm, and a depth of 95 nm using an ultraviolet setting resin on a disk-shaped glass with a thickness of 1.2 mm and a diameter of 300 mm, was set in a vacuum chamber of a three-element magnetron sputtering apparatus. After the interior of the vacuum chamber was temporarily evacuated to $5 \times 10^{-5}$ Pa, Ar gas was supplied, and sputtering was performed while maintaining the Ar gas pressure at $2 \times 10^{-1}$ Pa. First, a 70-nm thick SiN protective film 1 was formed on the substrate S using an SiN target. Then, a first magnetic layer (lower coercivity layer) 2 comprising a 20-nm thick $Gd_{22.6}(Fe_{70}Co_{30})_{77.4}$ (suffixes represent atomic %) film was formed using a GdFeCo alloy target. Furthermore, a second magnetic layer (higher coercivity layer) 3 comprising an 80-nm thick $Tb_{23}Fe_{77}$ film was formed on the first magnetic layer using a TbFe alloy target. The ratio $t_2/t_1$ of the film thickness $t_1$ of the first magnetic layer and the film thickness $t_2$ of the second magnetic layer under this condition is 4.

Figure 2:
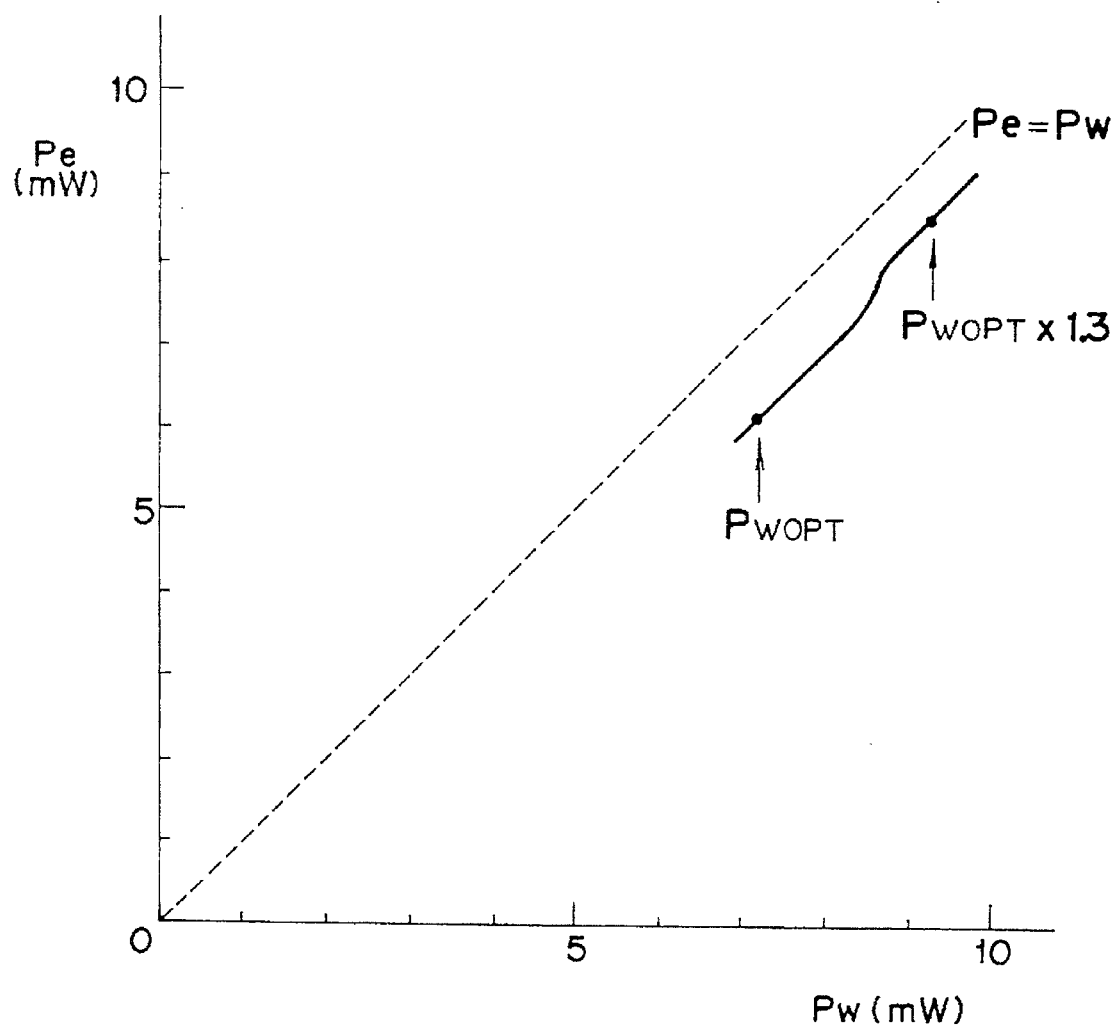
FIG. 2 is a graph showing the relationship between the laser power in a recording mode and the minimum laser power required for erasing a mark recorded with the recording power in the recording medium according to the example of the present invention.

Finally, a 70-nm thick protective layer 4 was formed using an SiN target again. Note that the protective layers 1 and 4 are formed for protecting the magnetic layers, but are not indispensable in the invention. The Curie temperatures of the magnetic layers formed in this manner were respectively 400° C. or higher (first magnetic layer 2) and 140° C. or higher (second magnetic layer 3). FIG. 2 shows the relationship between the laser power in a recording mode and the laser power in an erasing mode in this medium. The recording/erasing conditions were: a medium linear velocity=23 m/s, a recording frequency=1.6 MHz, a recording field=300 Oe, and an erase field=400 Oe. The optimal recording laser power ($P_{WOPT}$: recording laser power at which the secondary distortion of a reproduced signal was minimized upon recording of a signal of DUTY 50%) of this recording medium was 7.1 mW. When recording was performed with laser power of 9.2 mW (1.3 times of the optimal recording laser power) on this recording medium, power required for erasing was 8.5 mW which was 0.92 times of the recording power, and information could be erased with power equal to or lower than the recording laser power.

Example 2

Recording media were manufactured following the same procedures as in Example 1, so that the film thicknesses of two magnetic layers satisfied $t_2/t_1 \geq 2.5$. Table 1 below shows the ratios between the laser power in a recording mode and the power required for erasing in these recording media (the recording laser power was set to be 1.3 times of the optimal recording laser power: $P_{WOPT}$).

As can be seen from Table 1, a recorded mark can be erased with erasing laser power ($P_e$) equal to or lower than recording laser power ($P_W$).

TABLE 1

| $t_1$ (nm) | $t_2$ (nm) | Film Thickness Ratio | $P_w$ (= 1.3 × $P_{WOPT}$) | $P_e$ | $P_e/P_w$ |
|---|---|---|---|---|---|
| 10 | 90 | 9.0 | 9.70 | 9.00 | 0.93 |
| 8 | 60 | 7.5 | 8.05 | 7.40 | 0.92 |
| 8 | 40 | 5.0 | 7.65 | 7.25 | 0.95 |
| 10 | 40 | 4.0 | 7.70 | 7.30 | 0.95 |
| 20 | 70 | 3.5 | 9.10 | 8.75 | 0.96 |
| 20 | 60 | 3.0 | 8.50 | 8.30 | 0.98 |
| 20 | 50 | 2.5 | 8.20 | 8.05 | 0.98 |

Comparative Example 1

Recording media were manufactured following the same procedures as in Example 1, so that the film thicknesses of two magnetic layers satisfied $t_2/t_1 < 2.5$. Table 2 below shows the ratios between the laser power in a recording mode and the power required for erasing in these recording media (the recording laser power was set to be 1.3 times of the optimal recording laser power: $P_{WOPT}$).

As can be seen from Table 2, an erasing laser beam must be radiated with power ($P_e$) equal to or higher than recording laser power ($P_W$).

TABLE 2

| $t_1$ (nm) | $t_2$ (nm) | Film Thickness Ratio | $P_w$ (= 1.3 × $P_{WOPT}$) | $P_e$ | $P_e/P_w$ |
|---|---|---|---|---|---|
| 30 | 70 | 2.3 | 9.05 | 9.35 | 1.03 |
| 20 | 40 | 2.0 | 7.90 | 8.30 | 1.05 |
| 30 | 60 | 2.0 | 8.60 | 9.20 | 1.07 |
| 40 | 60 | 1.5 | 8.80 | 9.70 | 1.10 |
| 50 | 50 | 1.0 | 8.65 | 9.90 | 1.14 |

Example 3

A recording medium was manufactured following the same procedures as in Example 1. In the recording medium of this example, the first magnetic layer consisted of $Gd_{22}(Fe_{60}Co_{40})_{78}$ and the second magnetic layer consisted of $Tb_{20}Fe_{76}Co_4$. The first magnetic layer had a Curie temperature of 400° C. or higher, and the second magnetic layer had a Curie temperature of 180° C. or higher.

Media having the above-mentioned compositions were manufactured, so that the film thicknesses of the magnetic layers satisfied $t_2/t_1 \geq 2.5$. Table 3 below shows the ratios between the recording power and the power required for erasing in these recording media (the recording power was set to be 1.3 times of the optimal recording laser power).

As can be seen from Table 3, even when the type of magnetic layer is different, a recorded mark can be erased with erasing laser power ($P_e$) equal to or lower than recording laser power ($P_W$).

TABLE 3

| $t_1$ (nm) | $t_2$ (nm) | Film Thickness Ratio | $P_w$ (= 1.3 × $P_{WOPT}$) | $P_e$ | $P_e/P_w$ |
|---|---|---|---|---|---|
| 8 | 40 | 5.0 | 10.80 | 10.15 | 0.94 |
| 10 | 40 | 4.0 | 10.80 | 10.20 | 0.94 |
| 15 | 45 | 3.0 | 11.10 | 10.85 | 0.98 |
| 20 | 50 | 2.5 | 11.30 | 11.25 | 1.00 |
| 16 | 40 | 2.5 | 11.05 | 10.85 | 0.98 |

Comparative Example 2

Media of Comparative Example 2 were manufactured, so that magnetic layers had the same composition ratios as those in Example 3, and their film thicknesses satisfied $t_2/t_1 < 2.5$. Table 4 below shows the ratios between the recording power and the power required for erasing in these recording media (the recording power was set to be 1.3 times of the optimal recording laser power).

TABLE 4

| $t_1$ (nm) | $t_2$ (nm) | Film Thickness Ratio | $P_w$ (= 1.3 × $P_{WOPT}$) | $P_e$ | $P_e/P_w$ |
|---|---|---|---|---|---|
| 20 | 40 | 2.0 | 11.10 | 11.60 | 1.05 |
| 20 | 30 | 1.5 | 10.95 | 12.00 | 1.10 |

As described above, according to the present invention, a magnetooptical recording medium in which information can be erased by radiating laser power substantially equal to recording laser power without impairing the characteristics of a two-layered recording medium including two recording layers, can be obtained. More specifically, a recording medium with high recording sensitivity and a high C/N ratio of a reproduced signal can be obtained.

What is claimed is:

1. A magnetooptical recording medium comprising:
   a substrate formed with a guide groove for tracking a laser beam; and first and second magnetic layers which are stacked on said substrate, the first magnetic layer consisting of GdFeCo and the second magnetic layer consisting of an amorphous heavy rare earth-transition metal alloy, said first and second magnetic layers being magnetically coupled to each other, said first magnetic layer having a Curie temperature that is higher than the Curie temperature of said second magnetic layer and having a coercivity at room temperature that is lower than the coercivity of said second magnetic layer at room temperature, wherein a film thickness $t_1$ of said first magnetic layer and a film thickness $t_2$ of said second magnetic layer satisfy:

$t_2/t_1 \geq 2.5$.

* * * * *